US008268957B2

(12) United States Patent
Liu et al.

(10) Patent No.: US 8,268,957 B2
(45) Date of Patent: Sep. 18, 2012

(54) POLYETHYLENE IMINE BASED PIGMENT DISPERSANTS

(75) Inventors: Yanfei Liu, Shanghai (CN); Frank Oliver Heinrich Pirrung, Binzen (DE); Haiyang Yu, Shanghai (CN); Huiguang Kou, Shanghai (CN)

(73) Assignee: BASF SE, Ludwigshafen (DE)

( * ) Notice: Subject to any disclaimer, the term of this patent is extended or adjusted under 35 U.S.C. 154(b) by 567 days.

(21) Appl. No.: 12/225,642

(22) PCT Filed: Mar. 19, 2007

(86) PCT No.: PCT/EP2007/052552
§ 371 (c)(1),
(2), (4) Date: Sep. 26, 2008

(87) PCT Pub. No.: WO2007/110333
PCT Pub. Date: Oct. 4, 2007

(65) Prior Publication Data
US 2010/0174046 A1 Jul. 8, 2010

(30) Foreign Application Priority Data

Mar. 29, 2006 (EP) .................................... 06111887

(51) Int. Cl.
*C08G 73/00* (2006.01)
(52) U.S. Cl. .......... 528/332; 525/63; 525/379; 525/386; 525/415
(58) Field of Classification Search .................. 524/599; 525/63, 379, 386, 415; 528/332
See application file for complete search history.

(56) References Cited

U.S. PATENT DOCUMENTS

| | | | | |
|---|---|---|---|---|
| 3,728,143 A | * | 4/1973 | Pollard | 106/452 |
| 3,778,287 A | * | 12/1973 | Stansfield et al. | 106/496 |
| 4,963,275 A | * | 10/1990 | Gutierrez et al. | 508/192 |
| 6,787,600 B1 | | 9/2004 | Thetford et al. | 524/599 |

FOREIGN PATENT DOCUMENTS

JP  7-25993  1/1995

OTHER PUBLICATIONS

Patent abstracts of Japan Pub. No. 07025993.
Computer Translation of JP 07-25993.

* cited by examiner

*Primary Examiner* — Gregory Listvoyb
(74) *Attorney, Agent, or Firm* — Qi Zhuo; Shruti Costales

(57) ABSTRACT

This invention refers to a novel process for the synthesis of polyethylene imine (PEI)-based pigment dispersants characterized by a "grafting from" approach, allowing the manufacture of solvent based dispersant systems. The polyethylene imine (PEI)-based pigment dispersant can be presented by the formula (I) $X-(T)_m-P-(T)_n-H$ wherein P is a polyethyleneimine (PEI) back-bone; T is a residue —CO-A-O— wherein A is $C_2$-$C_{12}$ alkylene optionally substituted with $C_1$-$C_6$ alkyl with the proviso that each linkage between P and T is an amide bond and each linkage between X and T is an ester bond, X is a modifier or terminator residue R—CO— wherein R is a linear or branched, saturated or unsaturated alkanecarboxylic acids having from 1 to 22 carbon atoms or an unsaturated fatty acid residue or a hydroxycarboxylic residue or a polyester residue obtained from polycondensation of hydroxycarboxylic acids, or an acid terminated polyether; n, m independently are a number from 1 to 100.

10 Claims, No Drawings

POLYETHYLENE IMINE BASED PIGMENT DISPERSANTS

This invention refers to a novel process for the synthesis of polyethylene imine (PEI)-based pigment dispersants characterized by a "grafting from" approach, allowing the manufacture of solvent based dispersant systems.

The European Patent Publication EP0 208 041B1 describes a dispersant comprising a poly($C_2$-$_4$-alkyleneimine) carrying at least two mono- or poly-(carbonyl-$C_1$-$_7$-alkyleneoxy) groups prepared according to the so called "grafting to" process. The backbone is polyethylene imine of various molecular weights (1000-100,000 g/mol), the grafting chain is a polyester, particularly a polylactone, which is obtained by carboxylic acid initiated ring-opening polymerization of lactones (e.g. caprolactone). Afterwards, these polyester chains are reacted with polyethylene imine through both quaternization (forming salt bonds) and amidification (forming amide bonds) reactions between acid and amine groups. The salt bond is easily splitted to obtain free $NH_2$ groups resulting in yellowing of the final resin.

The PEI initiated ring-opening polymerization of lactone has been briefly mentioned in EP0 208 041 B1, however, EP0 208 041B1 is completely silent as to any further reaction steps of the thus opened lactone.

The key competitive grades are yellowish crystalline solids with low solubility in non-aromatic solvents, and only limited solubility in aromatic solvents.

JP07 025993 discloses a poly(lower alkylene imine) modified lactone graft polymer, obtained by ring-opening polymerisation of a lactone with a poly(lower alkylene imine) with an alkylene chain of 1-6 carbon atoms. The polymer obtained by this process has a backbone of poly(lower alkylene imine) with pending ester groups X1 and X2 linked by amide linkages. JP07 025993 discloses the grafting copolymerization of caprolactone and PEI, but no further transesterification step. Compared to JP07 025993 the "grafting from" copolymerization and the transesterification occurs in the present case in sequence (the two-step method) or in-situ (the one-pot method). The structure and the property of the products obtained is different to that obtained in JP 07 025993.

U.S. Pat. No. 6,787,600 (Lubrizol) discloses a dispersant made by either reacting the PAI/PEI with hydroxycarboxylic acids or lactones thereof in a stepwise manner or by reacting PAI/PEI with performed polyester chain. Compared to U.S. Pat. No. 6,787,600 the present dispersant is made by reacting PAI with carboxylic compounds and lactones, either by a 'two-step' method or by a "one-pot" method.

One aspect of the invention is to provide a dispersant having improved storage stability and improved compatibility in medium polar or non-polar systems. Furthermore the dispersant should show less-yellowing in white pigment formulations and less viscosity of pigment concentrates.

It has now been found that superior dispersants can be made by the so called "grafting from" process. "Grafting from" means PEI is used as macroinitiator to initiate the ring-opening polymerization of lactones. The products are hydroxy-functionalized grafting copolymers which are further modified. The modified copolymers have at least two types of side chains which are linked to the PEI via an amide bond. One side chain is OH-terminated, more polar and hydrophilic and derived from the lactone. This chain can be presented as

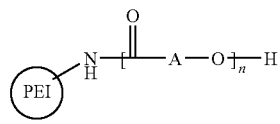

The other side chain is the modified one. This chain is apolar or medium polar and hydrophobic and can be presented as

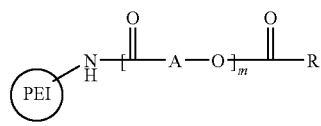

Depending on the preparation process there might be a third chain which can be presented as

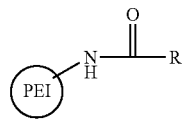

Thus, the invention relates to a polyethylene imine (PEI)-based pigment dispersant of the formula I X-(T)$_m$-P-(T)$_n$-H wherein
is a polyethylene imine (PEI) backbone;
T is a residue —CO-A-O— wherein A is $C_2$-$C_{12}$ alkylene optionally substituted with $C_1$-$C_6$ alkyl with the proviso that each linkage between P and T is an amide bond and each linkage between X and T is an ester bond,
X is a modifier or terminator residue R—CO— wherein R—CO— is a linear or branched, saturated or unsaturated alkanecarboxylic acid residue having from 1 to 22 carbon atoms or an unsaturated fatty acid residue or a hydroxycarboxylic residue or a polyester residue obtained from polycondensation of hydroxycarboxylic acids, or a residue of an acid terminated polyether;
n, m independently are a number from 1 to 100.

DEFINITIONS

Amide bond can be a) with primary N-atom; b, with secondary N-atom or salt bonds a:

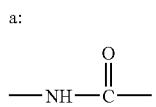

b:

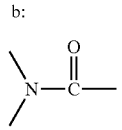

The polyethylene imine (PEI) may be branched or straight chain having an average molecular weight in the range from 200 to 100,000 g/mol. Preferred is PEI with a molecular weight in the range of 1000 g/mol to 50,000 g/mol. Water-free versions are preferred.

The group $(T)_n$ or $(T)_m$ are poly(carboxyalkylene oxy) chains —CO-A-O—)n, m which can be polyesters obtained by ring-opening polymerization of lactones e.g. from epsilon-caprolactone, gamma-caprolactone, propiolactone, beta-butyrolactone, gamma-butyrolactone, gamma-valerolactone, delta valerolactone, gamma-decanolactone, delta-decanolactone and the like or from alkyl substituted lactones.

Preferred lactones are epsilon-caprolactone or delta-valerolactone or mixtures thereof. A is therefore preferably $C_4$-$C_5$alkylene.

The modifier or terminator residue X is derived from carboxylic acid and/or carboxylic acid ester derivatives, which are reacted with the terminal OH-functionality of the grafted chains (T) by esterification (condensation process, water liberated) or transesterification (condensation, alcohol molecule liberated).

Examples of linear or branched, saturated or unsaturated alkanecarboxylic acids having from 1 to 22 carbon atoms are acetic acid, caproic acid=hexanoic acid $(CH_3—(CH_2)_4—COOH$, heptanoic acid, octanoic acid, methyloctanoic acid, nonanoic acid, 3,3,5-isononanoic acid, decanoic acid, undecanoic acid, undecenoic acid, lauric acid=dodecane acid $(CH_3—(CH_2)_{10}COOH$, myristic acid, stearic acid and the like.

Examples of unsaturated fatty acids are oleic acid, linolenic acid, palmitoleic acid, myristoleic acid, arachidonic acid, or tall oil fatty acid and the like.

Examples of acid esters are methyloleate, butyloleate, octyloleate, methylstearate and similar $C_1$-$C_8$ alkyl esters of saturated and unsaturated linear or branched carboxylic acids as mentioned above.

The term "hydroxycarboxylic acid" refers to monomers having at least one carboxylic acid group and at least one hydroxy group but which may also include other substituents which do not interfere with the polymerization of the monomer. Examples of suitable substituents on the hydroxycarboxylic acid include e.g. linear, branched or cyclic, saturated or unsaturated alkyl, linear, branched or cyclic, saturated or unsaturated alkoxy, halo, and the like. Hydroxy-carboxylic acids are well known in the art of polyester production, and are capable of producing polyester polymers via self-polycondensation polymerization reactions. Examples of suitable hydroxycarboxylic acids include e.g. 12-hydroxystearic acid $CH_3—(CH_2)_5—CHOH—(CH_2)_{10}—COOH$, ricinoleic acid=[(R)-12-hydroxy-(Z)-9-octadecenoic acid], hydroxycaproic acid and hydroxyacetic acid.

The chain length of the polyester is 1 to 100, preferably 1 to 10, more preferably 1 to 5.

Preferred is polyhydroxystearic acid (PHSA), with acid numbers of PHSA preferably between 10 and 200 mg KOH/g.

The term "acid terminated polyether" refers e.g. to succinic anhydride modified (methoxy)-polyalkyl glycol, molecular weights are 200 to 5000 g/mol, preferably 200 to 2,000 g/mol.

Process:

The PEI-based pigment dispersant of the formula I is prepared based on the "grafting from" approach through either a two step or one pot method.

The process is characterized by
a) using PEI as macroinitiator to initiate the ring-opening polymerisation of lactones by the primary amines and the secondary amines of PEI to obtain $P-(T)_n-H$ b) (trans)esterification of grafted copolymers with the modifier or terminator X.

In the two-step method, step a) is followed by step b.

In the one-pot method the reaction system is more complex. "Grafting from" copolymerization and (trans)esterification are operated in one pot. The products are obtained in one step.

The product obtained has at least two types of grafted side chains. Preferably at least 50% of the final groups —CO-A-OH of the compound $P-(T)_n-H$ are (trans)esterified. These compounds carry at least a side chain attached to the PEI by amid bond which side chain further comprises an ester bond in the chain obtained by the transesterification process.

The chain length of the grafted side chain is determined by the relative molar ratio of used lactone to reactive amine group of PEI. The weight ratio of PEI to lactone monomers ranges from 1:1 to 1:50, therefore the designed MW of polylactones approximately ranges from 100 to 10,000 g/mol. Preferably the weight ratio of PEI to lactone monomers ranges from 1.1 to 1.20, therefore the designed chain length of polylactones approximately ranges from 500 g/mol to 5000 g/mol.

Reaction temperatures range from 60° C. to 200° C. under $N_2$ atmosphere for the "grafting from" copolymerization and from 100° C. to 200° C. under $N_2$ atmosphere during (trans) esterification.

The (trans)esterification catalyst may be any catalyst suitable in this field. Examples are Tin (II) salts e.g. Tin (II) octoate, dibutyltin dilaurate, dibutyltin dichloride, or Tin (IV) compound $SnCl_4$, or titanium complexes e.g. tetrabutyltitanate, tetraisopropyltitanate, or aluminum complexes e.g. tris (acetylacetonato)aluminum, (porphinato)aluminum.

Preferably reaction temperatures range from 150° C. to 180° C. under $N_2$ atmosphere.

The pigment dispersants of the formula I preferably have acid numbers of 0-50 mg KOH/g, preferably from 0-30 mg KOH/g, The grafting ratio, defined as total reactive amine groups divided by grafted polymer chains (T), is determined according to the contents of the primary and secondary amino groups in the PEI molecule.

Grafting efficiency, defined as polymer grafted divided by total amount of polymer, is up to 100%.

The grafting density is preferably >30%.

The preferred products have lower acid number, generally less than 20 mg KOH/g, preferably less than 5 mg KOH/g, which indicates that the linkage of PAI and polyester chain is mainly via amide bonding.

Advantage

The pigment dispersant of the formula I is amphiphilic because the grafted polyester chain is a mixture of hydrophilic (HO-terminated) and hydrophobic (alkyl terminated) polymer chains. With (trans)esterification, the polarity and therefore the compatibility of the graft copolymer can be adjusted by using various carboxylic acids or hydroxycarboxylic acids.

This method enables an enormous flexibility of adjusting the same OH-functional prepolymer to the situation or condition, by choosing the right carboxylic acid or mixture of carboxylic acid derivatives at the end of the process.

The amine-initiated ring-opening polymerisation kinetics is very much faster than the acid initiated polymerisation as presented in the state of the art. The (hydroxy)carboxylic acid materials in the one-pot process also can act as co-catalyst to accelerate the polymerization. Products with good performance can be obtained in a shorter reaction time with less amount of catalyst, which indicates that the manufacturing costs of one-pot 'grafting from' approach are lower.

The products obtained by this invention generally show good compatibility in a wide range of let-down resin systems, e.g. alcohol alkyd, CAB etc. The viscosity of pigment concentrates is lower, indicating the possibility of higher pigment loading; draw-downs and pour-outs of different pigment preparations show high gloss, less flocculation and no seeding.

Due to the complete consumption of reactive free amines in the grafting from approach, considerable less yellowing of white formulations in stoving alcohol alkyd let-downs can be obviously observed. For carbon black pigments like FW 200, the dispersants show very good dispersibility compared to the prior art.

The removal of all reactive amine groups and the amphiphilicity of grafted polyester chains are the origins of many of the obtained effects, while the somewhat more irregular arrangement of the grafted chains lead to a better solubility and less crystallizing behaviour, while using similar monomers as prior arts, where these features are absent.

The storage stability of the product is improved, it appears compatible with most paint systems and shows lower viscosity of pigment concentrates, high gloss and less yellowing of white formulations.

Use

The dispersant is used to stabilise pigment dispersions. The moieties being 'grafted from' are polyester side chains, which interact with the resin phase and are necessary to build up a steric environment to stabilize the pigment dispersion. The polyethylene imine part of the polymer has affinity for the pigment surface (anchoring group) and therefore provides a strong physical binding of the dispersant to the solid pigment particle.

The dispersant may be use to stabilize dispersions of pigments and/or fillers for application in coatings, plastics, adhesives, inks and toners, especially ink jet inks, electronic materials like color filter formulations, construction materials like casting resins, formulations for cosmetics and personal care like nail coatings.

The dispersant may also be used to disperse functional particles like particles to enhance electric or thermal conductivity, e.g. metal particles, graphite, organic and inorganic nano-particles, carbon nanotubes, or magnetic particles, or to disperse charged electrophoretic particles for display applications.

The dispersant may also be used to disperse effect pigments like aluminium flake pigments, mica. The dispersant may also be used for surface modification of pigments, e.g. to improve easy redispersibility of dry pigment powders.

EXAMPLES

1. Examples for the Two Step Method

Step 1. Preparation of HO-Functionalized Graft Copolymers by "Grafting from" Approach.

Example 1 (CL:PEHA=16:1, w/w)

Pentaethylene hexamine 5.0 g (PEHA, Aldrich, MW 232), ε-caprolactone 78.8 g, and dibutyltin dilaurate 0.04 g were stirred under nitrogen and heated to 125° C. for 6.0 h. After cooling, the product was obtained as a yellow clear liquid with a solid content is above 98%. The amine number is 32 mg KOH/g.

Examples 2-5 (CL:Epomin SP-018=7.75:1, w/w)

Examples 2-5 were prepared according to the following process: Epomin SP-018 32.25 g (1 part, trade name, from Nippon Shokubai, MW 1800), ε-caprolactone 250.0 g (7.75 parts), and dibutyltin dilaurate ($5.0*10^{-4}$ w/w) were stirred under nitrogen and heated in a range of 80-200° C. for 1.0-30 h until solid contents reached 98%. Table 1 lists the results.

TABLE 1

| Example | Reaction conditions | | Product properties | |
|---|---|---|---|---|
| | T ° C. | t/h | Amine number mg KOH/g | Appearance |
| 2 | 100 | 18.0 | 65 | Clear liquid |
| 3 | 125 | 4.0 | 64 | Clear liquid |
| 4 | 150 | 4.0 | 56 | Brown wax |
| 5 | 170 | 5.5 | — | Brown wax |

Examples 6-11 (CL:Epomin SP-018=20.0:1, w/w)

Examples 6-11 were prepared according to the flowing process: Epomin SP-018 12.5 g (1 part), ε-caprolactone 250.0 g (20.0 parts), and dibutyltin dilaurate ($5.0*10^{-4}$ w/w) were stirred under nitrogen and heated in a range of 80-200° C. for 1.0-30 h until solid contents reached 98%. Table 2 lists the results.

TABLE 2

| Example | Reaction conditions | | Product properties | |
|---|---|---|---|---|
| | T ° C. | t/h | Amine number mg KOH/g | Appearance |
| 6 | 125 | 8.0 | 33 | Solid |
| 7 | 125 | 14.5 | 29 | Solid |
| 8 | 125 | 17.0 | 26 | Solid |
| 9 | 125 | 19.0 | 25 | Solid |
| 10 | 125 | 22.0 | 22 | Solid |
| 11 | 150 | 6.0 | 30 | Solid |

Examples 12-17 (CL:Lupasol PR 8515 with Various Weight Ratios)

Examples 12-17 were prepared according to the following process: Lupasol PR 8515 (trade name, from BASF, MW 2000), ε-caprolactone 100.0 g, and dibutyltin dilaurate ($5.0*10^{-4}$ w/w) were stirred under nitrogen and heated at 100-200° C. until solid contents reached 98%. Table 3 lists the results.

TABLE 3

| Example | CL:PEI w/w | Reaction conditions | | Product properties | |
|---|---|---|---|---|---|
| | | T ° C. | t/h | Amine number mg KOH/g | Appearance |
| 12 | 5.5 | 150 | 4.0 | 87 | Clear liquid |
| 13 | 7.5 | 150 | 4.0 | 75 | Clear liquid |
| 14 | 10.5 | 150 | 6.0 | 45 | Yellow wax |
| 15 | 13.0 | 150 | 6.5 | 40 | Brown wax |
| 16 | 15.0 | 150 | 8.0 | 35 | Solid |
| 17 | 20.0 | 180 | 4.0 | 29 | Solid |

Examples 18-25 (CL:Epomin SP-200 with Various Weight Ratios)

Examples 18-25 were prepared according to the following process: Epomin SP-200 (trade name, from Nippon Shokubai, MW 10,000), ε-caprolactone 100.0 g, and dibutyltin dilaurate ($5.0*10^{-4}$ w/w) were stirred under nitrogen and heated to 100-200° C. until solid contents reached 98%. Table 4 lists the results.

TABLE 4

| Example | CL:PEI w/w | Reaction conditions T ° C. | t/h | Product properties Amine number mg KOH/g | Appearance |
|---|---|---|---|---|---|
| 18 | 7.5 | 100 | 14.0 | 80 | Solid |
| 19 | 7.5 | 170 | 4.0 | — | Solid |
| 20 | 15.0 | 180 | 4.0 | — | Solid |
| 21 | 20.0 | 125 | 12.5 | 41 | Solid |
| 22 | 20.0 | 125 | 16.0 | 39 | Solid |
| 23 | 20.0 | 125 | 30 | 33 | Solid |
| 24 | 20.0 | 160 | 9.0 | 35 | Solid |
| 25 | 20.0 | 180 | 5.5 | — | Solid |

Example 26 (Epomin SP-018, MW 1800 g/mol, CL:VL=1:1)

Polyethyleneimine 5.0 g (1 part, Epomin SP 018, Nippon Shokubai, approx. MW 1800), ε-caprolactone 35.0 g (7.0 parts), δ-valerolactone 35.0 g (VL, 7.0 parts) and dibutyltin dilaurate 0.05 g were stirred under nitrogen and heated to 150° C. for 5.0 h. After cooling, the product was obtained as a yellow clear liquid with a solid content above 98%. The amine number is 50 mg KOH/g.

Example 27 (Epomin SP-200, MW 10,000 g/mol, CL:VL=1:1)

Polyethyleneimine 5.0 g (1 part, Epomin SP 200, Nippon Shokubai, approx. MW 10,000), ε-caprolactone 35.0 g (7.0 parts), δ-valerolactone 35.0 g (7.0 parts) and dibutyltin dilaurate 0.05 g were stirred under nitrogen and heated to 150° C. for 5.0 h. After cooling, the product was obtained as a yellow clear liquid with a solid content above 98%.

Step 2. Modification of OH-Functionalized Grafted Copolymers

Examples 28-34 (Modified with Different Carboxylic Acids)

Example 24 (Table 4) was used as precursor (50.0 g) and stirred with carboxylic acid (1.5:1 in mol ratio of polylactone chain:acid) in a temperature range of 100-200° C. for 1.0-40.0 h under a nitrogen atmosphere. The acid number of product was measures by titration. Table 5 lists the results.

TABLE 5

Esterification with different carboxylic acids.

| | Carboxylic Acid | | Product properties | |
|---|---|---|---|---|
| Example | name | m/g | Acid number mg KOH/g | Appearance |
| 28 | Acetic acid | 1.14 | 16 | Solid |
| 29 | Caproic acid | 2.21 | 16 | Solid |
| 30 | Lauric acid | 3.81 | 15 | Solid |
| 31 | Stearic acid | 5.65 | 16 | Solid |
| 32 | Hydroxystearic acid | 5.93 | 16 | Solid |
| 33 | Ricinoleic acid | 5.65 | — | Solid |
| 34 | Tall Oil Fatty Acid | 5.65 | — | Solid |

Examples 35-49 (Modified with Lauric Acid)

The graft copolymer obtained in Step 1 was used as precursor and stirred with lauric acid (1.5:1 in mol ratio of polylactone:lauric acid) in a temperature range of 100-200° C. for 1.0-30.0 h under a nitrogen atmosphere. The acid numbers of the products were measured by titration.
Table 6 lists the reaction conditions and the results.

TABLE 6

Modification with lauric acid.

| | Precursors | | | Reaction conditions | | Product properties Acid-number | |
|---|---|---|---|---|---|---|---|
| Example | Example | PEI | CL:PEI | T ° C. | t/h | mg KOH/g | Appearance |
| 35 | 1 | PEHA | 16:1 | 150 | 20.0 | 37 | Clear liquid |
| 36 | 12 | Lupasol | 5.5:1 | 150 | 9.0 | 19 | Liquid |
| 37 | | PR 1800 | | | 25.0 | 12 | Wax |
| 38 | 13 | | 7.5:1 | 150 | 8.0 | 22 | Wax |
| 39 | 14 | | 10.5:1 | 150 | 11.0 | 24 | Wax |
| 40 | 15 | | 13:1 | 150 | 15.0 | 12 | Solid |
| 41 | 16 | | 15:1 | 180 | 5.0 | 8 | Solid |
| 42 | 17 | | 20:1 | 150 | 7.0 | 17.0 | Solid |
| 43 | 18 | Epomin | 7.5:1 | 150 | 18.0 | 12 | Solid |
| 44 | 20 | SP-200 | 15:1 | 150 | 20.0 | 15 | Solid |
| 45 | 22 | | 20:1 | 150 | 12 | 22 | Solid |
| 46 | 23 | | | 160 | 7.0 | 20 | Solid |
| 47 | 24 | | | 180 | 9.0 | 7 | Solid |
| 48 | 26 | Epomin SP-018 (10CL:10VL):1 | | 150 | 8.0 | 20 | Liquid |
| 49 | 27 | Epomin SP-200 (10CL:10VL):1 | | 150 | 8.0 | — | Liquid |

Examples 50-53 (Modified with Hydroxystearic Acid)

Example 25 (210 g, Table 4) was stirred with 12-hydroxystrearic acid (24.0 g) at 170° C. for 1.0-30.0 h under a nitrogen atmosphere. The acid numbers of products were measured by titration. Table 7 lists the results.

TABLE 7

Modification with HSA.

| | | Product properties | |
|---|---|---|---|
| Example | Reaction time/h | Acid number mg KOH/g | Appearance |
| 50 | 7.0 | 22 | Solid |
| 51 | 9.5 | 16 | Solid |
| 52 | 13.0 | 12 | Solid |
| 53 | 18.0 | 7 | Solid |

Examples 54-60 (Modified with PHSA of Various MW)

12-Hydroxystearic acid (200.0 g) and dibutyltin dilaurate (0.20 g) were added in a four-neck reactor equipped with a condensation water separator and stirred at 180° C. for 1.0-60.0 h under a nitrogen atmosphere. The by-product water was removed by refluxing with benzene. Poly(hydroxystearic acid) (PHSA) with different acid numbers was obtained according to different reaction times.

Example 25 (Table 4) was used as precursor and stirred with the obtained PHSA (1.5:1 in mol ratio of polylactone: hydroxystearic acid) at a temperature of 160° C. for 1.0-20.0 h under a nitrogen atmosphere. The acid numbers of the products were measured by titration. Table 8 lists the reaction conditions and the results.

TABLE 8

Modification with PHSA of different MW.

| | | PHSA | | | product acid |
|---|---|---|---|---|---|
| Exp. | Precursor | No. | acid number mg KOH/g | t/h | number mg KOH/g |
| 54 | example 18 | PHSA-1 | 95 | 11.0 | 10 |
| 55 | CL:SP-018 = 20:1 | PHSA-2 | 60 | 10.0 | 14 |
| 56 | (w/w) | PHSA-3 | 43 | 12.0 | 6 |
| 57 | example 25 | PHSA-1 | 95 | 7.0 | 10 |
| 58 | CL:SP-200 = 20:1 | PHSA-2 | 60 | 10.0 | 10 |
| 59 | (w/w) | PHSA-3 | 43 | 12.0 | 9 |
| 60 | | PHSA-4 | 33 | 12.0 | 14 |

Examples 61-64 (Modified with Different Carboxylic Acid Esters)

Example 24 (Table 4) was used as precursor (50.0 g) and stirred with carboxylic acid esters (1.5:1 in mol ratio of polylactone chain:acid) in a reactor equipped with a dean stark separator, in a temperature range of 100-200° C. for 1.0-40.0 h under a nitrogen atmosphere. Tetrabutyltitanate (0.3%) was added as a transesterification catalyst. The conversion of the transesterification was checked by removed mols of alcohol. Table 9 lists the results.

TABLE 9

Transesterification with different carboxylic acid esters.

| | Carboxylic Acid Ester | | Product properties | |
|---|---|---|---|---|
| Example | name/supplier | m/g | Conversion by mols of alcohol removed | Appearance |
| 61 | Lauric acid methyl ester/Aldrich | 4.07 | 98% | Solid |
| 62 | Stearic acid methyl ester/Aldrich | 5.61 | 96% | Solid |
| 63 | Oleic acid n-butyl ester/Uniqema Chemie | 6.36 | 89% | Waxy |
| 64 | Tall Oil Fatty Acid Methyl Esters (Sylfat MM)/ Arizona Chemical | 5.65 | 92% | Solid |

2. Examples for the One-Pot Method

Example 65

Lupasol PR 8515 (6.45 g), epsilon-caprolactone caprolactone (50.0 g), 12-hydroxystearic acid (15.0 g) and dibutyltin dilaurate (0.12 g) were stirred at 180° C. for 18.0 h. The obtained product is a golden liquid at R T with an acid number of 2 mg KOH/g.

Example 66

Epomin SP-018 (6.45 g), epsilon-caprolactone (100.0 g), 12-hydroxystearic acid (15.0 g) and dibutyltin dilaurate (0.12 g) were stirred at 180° C. for 11.0 h. The obtained product is a yellowish solid with an acid number of 7.5 mg KOH/g.

Example 67

Epomin SP-018 (6.45 g), epsilon-caprolactone (85.0 g), delta-valerolactone (15.0 g), 12-hydroxystearic acid (15.0 g) and dibutyltin dilaurate (0.12 g) were stirred at 180° C. for 12.0 h. The obtained product is brownish liquid with an acid number of 15 mg KOH/g.

Example 68

Epomin SP-018 (6.45 g), epsilon-caprolactone (50.0 g), 12-hydroxystearic acid (30.0 g) and dibutyltin dilaurate (0.08 g) were stirred at 180° C. for 6.0 h. The obtained product is golden liquid with an acid number of 26 mg KOH/g.

Example 69

Epomin SP-020 (6.45 g), epsilon-caprolactone (100.0 g), 12-hydroxystearic acid (15.0 g) and dibutyltin dilaurate (0.12 g) were stirred at 180° C. for 12.0 h. The obtained product is a brownish solid with an acid number of 9 mg KOH/g.

Example 70

Epomin SP-020 (6.45 g), epsilon-caprolactone (100.0 g), PHSA-4 (Table 8, 80.0 g) and dibutyltin dilaurate (0.20 g) were stirred at 180° C. for 12.0 h. The obtained product is a brown solid with an acid number of 6 mg KOH/g.

Example 71

Epomin SP-020 (6.45 g), caprolactone (100.0 g), 12-hydroxylstearic acid (15.0 g) and dibutyltin dilauric (0.12 g)

were stirred at 180° C. for 15.0 h. Product is yellowish solid with acid number of 5 mg KOH/g.

Example 72

Epomin SP-020 (6.45 g), caprolactone (100.0 g), ethyl laurate (12.0 g) and dibutyltin dilauric (0.12 g) were stirred at 170° C. for 6.0 h. Product is yellowish solid with acid number of 4 mg KOH/g.

Example 73

Epomin SP-020 (6.45 g), caprolactone (100.0 g), methyl stearate (15.5 g) and dibutyltin dilauric (0.12 g) were stirred at 170° C. for 6.0 h. Product is yellowish solid with acid number less than 3 mg KOH/g.

Example 74

Epomin SP-020 (6.45 g), caprolactone (60.0 g), valerolactone (40.0 g), 12-hydroxylstearic acid (15.0 g) and dibutyltin dilauric (0.12 g) were stirred at 170° C. for 18.0 h. Product is amber liquid with acid number 12 mg KOH/g.

Example 75

Epomin SP-020 (6.45 g), caprolactone (60.0 g), valerolactone (40.0 g), methyl stearate (15.5 g) and dibutyltin dilauric (0.12 g) were stirred at 170° C. for 15.0 h. Product is amber liquid with acid number 3 mg KOH/g.

Example 76

Epomin SP-018 (6.45 g), caprolactone (60.0 g), valerolactone (40.0 g), 12-hydroxystearic acid (15.0 g) and dibutyltin dilauric (0.12 g) were stirred at 170° C. for 15.0 h. Product is amber liquid with acid number 2.9 mg KOH/g.

Example 77

Epomin SP-20 (3.25 g), Epomin SP-018 (3.25 g), caprolactone (60.0 g), valerolactone (40.0 g), methyl stearate (15.5 g) and dibutyltin dilauric (0.12 g) were stirred at 170° C. for 15.0 h. Product is amber wax with acid number less than 3 mg KOH/g.

Competitive Product A

Competitive product A is prepared according to dispersant 9 of U.S. Pat. No. 4,863,880

A mixture of 250 g of E-caprolactone, 88 g of lauric acid and 0.2 g of tetrabutyltitanate was stirred under nitrogen for 8 hours at 170° C. A mixture of 140 g of the obtained polyester and 20 g of a dry polyethylenimine "POLYMIN Waterfree" was stirred under nitrogen for 8 hours at 120° C.

TABLE 10

Melting temperature and re-crystallization temperature of dispersants.

| Sample | Competitive product A | 53 | 65 | 71 | 72 | 74 | 75 | 76 | 77 |
|---|---|---|---|---|---|---|---|---|---|
| Tm/° C. | 48.4 | 43.7 | <25 | 41.7 | 44.2 | <25 | 26.5 | ~35 | 27 |
| Tc/° C. | 30.2 | 26 | No | no | no | no | no | no | no |

Table 10 shows the melting temperature of the invention products are lower than that of the competitive product.

Performance Screening

In order to test the dispersing performance of the synthesized samples, Resin Free Pigment Concentrates were prepared according to the Formulation 1. The mill base was dispersed in Scandex Shaker for 1.5 h with the help of glass beads. Afterwards the mill base was filtered and stored at ambient temperature overnight. Let-downs (Formulation 2) for testing were based on a stoving enamel, a CAB base coat and a coil coating resin. Formulation 3 shows the paint formulations for the stoving enamel and CAB paints. The paint preparation was mixed under high speed stirring for 5 minutes at 2000 rpm, and applied on polyester film with a 35-75 μm wet film thickness. After preparing draw-downs, the rest of paints were diluted 1:1 with butyl acetate for a pour-out test. Formulation 4 represents a coil coating, which was applied on steel panel with a black strip, and after a rub-out test, baked for 7 seconds at 320° C.

Formulations 1. Preparation of Pigment Concentrates

| | Ingredients | Pigment Concentrate No. | | | | | | |
|---|---|---|---|---|---|---|---|---|
| | | 1 | 2 | 3 | 4 | 5 | 6 | 7 |
| 1) | Dispersant (100% solid) | 5.35 | 4.48 | 3.62 | 3.25 | 4.42 | 2.75 | 4.00 |
| 2) | 1-methoxy-2-propyl acetate (MPA) | 19.65 | 25.62 | 31.38 | 21.7 | 38.08 | | |
| 3) | Butyldiglycol | | | | | | 33.45 | |
| 4) | Solvesso 150 | | | | | | | 26.00 |
| 5) | Pigment White 21 | 75.00 | | | | | | |
| 6) | Pigment Black 7 (Special Black 100) | | 20.00 | | | | 13.80 | 20.00 |
| 7) | Pigment Blue 15:2 | | | 15.00 | | | | |
| 8) | Pigment Red 254 | | | | 25.00 | | | |
| 9) | Pigment Black 7 or Color Black FW 200 | | | | | 7.50 | | |
| 10) | 3.0 mm glass beads | 100.0 | 50.00 | 50.00 | 50.00 | 50.00 | 50 | 50 |
| | Total (g) | 200.0 | 100.0 | 100.0 | 100.0 | 100.0 | 100 | 100 |

Formulations 2. Let-Down Systems

| a) Stoving Enamel | Vialkyd AC 451 | 68.4 |
|---|---|---|
| | Maprenal MF 650 | 31.4 |
| | EFKA-3030 | 0.2 |
| | Total | 100 |
| b) CAB base coat | CAB 531-1 | 11.2 |
| | Butyl acetate | 51.9 |
| | Uracron CR 226 XB | 32.1 |
| | Uramex MF 821 | 4.8 |
| | Total | 100.0 |

-continued

| c) Coil coat | Cray Valley E20105 | 49.98 |
| --- | --- | --- |
| | Cymel 303 | 7.05 |
| | Nacure 1323 | 0.45 |
| | Butylglycol | 1.89 |
| | Solvesso 100 | 16.91 |
| | Pigment White 6 | 11.50 |
| | Total | 100.0 |

Maprenal MF 650: melamine resin, Degussa
Ciba ® EFKA ® 3030 is a modified polysiloxane solution slip and leveling agent
CAB-531 cellulose acetate butyrate material commercially available from Eastman Chemical
Uracron CR 226 XB. DSM Coating Resins Uracron CR, OH acrylic
Uramex MF 821: DSM Coating Resins Uramex (amino)
Cymel 303 melamine resin, Cytec
Nacure 1323 amine-blocked sulfonic acid catalyst Formulation 3. CAB and Stoving Enamel Paints

| | Code | | |
| --- | --- | --- | --- |
| | 1 | 2 | 3 |
| Let-down (formulation 2a or 2b) | 9.0 | 7.5 | 7.0 |
| PC white (No. 1 in Formulation 1) | — | 2.0 | — |
| PC color (No. 2-5 in Formulation 1) | 1.0 | 0.5 | 3.0 |
| Total/g | 10.0 | 10.0 | 10.0 |

Formulation 4. Coil Coat Application

| Formulation 2c (white base coat) | 10.00 |
| --- | --- |
| PC (No. 6 or 7 in Formulation 1) | 0.67 |
| Total/g | 10.67 |

Examples 28-70 are acid-modified dispersants and their performance was tested according to Formulations 1, 2, 3 and 4. It was observed, that the pigment concentrates flow well and their viscosities were lower than the competitive grade. The rheological behavior of the pigment concentrates was measured with a Thermo-Haake RheoStress 600 equipment under the CR mode. The initial viscosities ($\eta_0$) and dynamic viscosities ($\eta_t$) of the pigment concentrates are listed in Table 11. According to the viscosity curves, the Pigment White concentrates (PW 21) have a Newtonian flow, while the Pigment Black concentrates (Special Black-100) exhibit a pseudoplastic flow. The Pigment Blue concentrates (PB 15:2) have plastic flows and thixotropic properties, but could easily flow under a low shear stress ($\tau$, in Table 11). Pigment Black 7 (Black FW 200) was dispersed very well by the products of this invention, but no dispersion was observed by competitive grade.

TABLE 11

Rheological data of Pigment Concentrates

| | PW 21 | | Special Black 100 | | PB 15:2 | |
| --- | --- | --- | --- | --- | --- | --- |
| Example | $\eta_0$/mPas | $\eta_t$/mPas | $\eta_0$/mPas | $\eta_t$/mPas | $\tau$/Pa (at Yield point) | $\eta_t$/mPas |
| The competitive product A | 1000 | 360 | >1000 | 300 | 50 | 150 |
| 17 | 1000 | 200 | 1000 | 150 | 18 | 80 |
| 36 | 300 | 160 | 150 | 50 | 5 | 60 |
| 38 | 250 | 45 | 250 | 40 | 5 | 50 |
| 39 | 300 | 170 | 500 | 70 | 18 | 70 |
| 42 | 1000 | 200 | >1000 | 160 | 30 | 150 |
| 44 | 500 | 180 | >1000 | 80 | 40 | 80 |
| 46 | 1000 | 300 | >1000 | 250 | 125 | 300 |
| 48 | 400 | 160 | >1000 | 250 | 60 | 80 |

In the stoving enamel paint, the CAB paint and the coil coating, the performance of the dispersants was generally very good with satisfactory results, e.g. high gloss (on average, above 80 at 20°), no seeding, no rub-out, good color strength, and less yellowing of the white pigment (Table 12).

In the solubility test, samples were dissolved in various solvents first with a concentration of 50% (w/w). Crystallization of the competitive sample was observed in all the tested solvents after keeping overnight at ambient temperature, whereas the solution of most of the invention samples showed a long-term stability (Table 13). It indicates that the invention samples are less crystallization, and their compatibility in various solvent systems is better than that of the competitive product. Performance tests also showed that the competitive product is more suitable for apolar systems, but not for polar systems; as a contrast, the products of this invention performed well in both polar and apolar systems.

TABLE 12

The Yellowness and Whiteness of draw downs.

| | Stoving | | CAB | |
| --- | --- | --- | --- | --- |
| Example | Yellowness | Whiteness | Yellowness | Whiteness |
| The competitive product A | 2.5 | 80 | −0.8 | 88 |
| 17 | 1.43 | 86 | −0.54 | 87 |
| 45 | 1.21 | 86 | 0.55 | 86 |
| 47 | 1.37 | 85 | −0.53 | 89 |
| 50 | 1.75 | 84 | −0.50 | 87 |
| 51 | 1.87 | 84 | 0.39 | 87 |
| 52 | 0.79 | 87 | −0.60 | 89 |
| 53 | 0.43 | 88 | −0.91 | 91 |
| 65 | 0.51 | 88 | −0.62 | 89 |
| 66 | 0.36 | 88 | −0.98 | 90 |
| 68 | 0.58 | 87 | −0.78 | 90 |

Measured by X-rite MA 68II multi-angle spectrophotometer at 45° according to criterion ASTM E313.

TABLE 13

Solubility of samples in various solvent (50%, w/w).*

| Example | 1-methoxy-2-propyl acetate | n-butyl acetate | 2-Butanone | Xylene |
|---|---|---|---|---|
| The competitive product A | Crystallized overnight | Crystallized overnight | Crystallized overnight | Crystallized overnight |
| 17 | Clear liquid | Clear liquid | turbid | insoluble |
| 53 | Partialy crystallized overnight | Slightly crystallized overnight | Partialy crystallized 1 week after | Partialy crystallized 1 week after |
| 59 | slightly crystallized overnight | slightly crystallized overnight | Slightly turbid 1 week after | slightly crystallized 1 week after |
| 65 | Clear solution | Clear solution | Clear solution | Clear solution |
| 58 | slightly crystallized 1 week after | slightly crystallized 1 week after | Clear solution | Clear solution |
| 66 | slightly crystallized 1 week after | slightly crystallized 1 week after | Clear solution | Clear solution |
| 67 | Clear solution | Clear solution | Clear solution | Clear solution |
| 68 | Clear solution | Clear solution | Clear solution | Clear solution |

The samples were dissolved first, and the results were observed after keeping the samples at ambient temperature. The solutions kept stable after 3 months.

Application in Inks

Competitor B is Prepared According to Ex. 48 of U.S. Pat. No. 6,197,877.

Lauric acid (10 parts, 0.049M), epsilon.-caprolactone (67 parts, 0.58M) and delta.-valerolactone (29.4 parts, 0.294M) were stirred under nitrogen and heated to 105° C. Zirconium isopropoxide (0.45 parts) was added and temperature raised to 170° C. The reactants were stirred under nitrogen at this temperature for a further 6 hours. (78 parts) of the product obtained and polyethyleneimine (6 parts approx. MW 10,000) were stirred under nitrogen and heated for a further 6 hours.

Table 14 shows the compatibility of dispersants with the UV resins/monomers. In general, all the liquid leads have better compatibility with UV resins/monomers.

Performance of the two liquid dispersant Ex. 74 and Ex. 75 were taken as representatives, and compared to competitor A and B according to the formulation A. The results (gloss and transparency) were shown in Table 15; Table 16 lists the storage stability of dispersants, which were characterized by viscosity of PCs.

All above results indicate that the invention products show better or compatible performance to competitor A and B.

TABLE 14

Compatibility of dispersants with the UV monomers/resins.

| Sample | w/w % of Add. | Competitor A | Competitor B | 66 | 67 | 71 | 74 | 75 | 76 | 77 |
|---|---|---|---|---|---|---|---|---|---|---|
| Ep-Acrylic | 6.25 | +/+ | | +/+ | +/+ | +/+ | +/+ | +/+ | +/+ | |
| Ur.-Acrylic | 5 | +/− | | +/+ | +/− | +/− | +/+ | +/+ | +/+ | |
| PE/Acrylic | 15 | +/− | | +/+ | +/− | +/− | +/+ | +/+ | +/+ | |
| TPGDA | 50 | +/− | +/− | +/+ | +/− | +/− | +/+ | +/+ | +/+ | +/− |
| HDDA | 50 | +/− | +/− | +/+ | +/+ | +/− | +/+ | +/+ | +/+ | +/+ |
| TMPEOTA | 50 | +/− | +/− | +/+ | +/+ | +/− | +/+ | +/+ | +/+ | +/− |
| TMPTA | 50 | +/− | +/− | +/+ | +/− | +/− | +/+ | +/+ | +/+ | +/− |

+/−: compatibility results at 40° C.-30 min/after cooling.
+: good;
−: crystallization.
The blank means no measurement.
Ep-Acrylic: Ebecry 606;
Ur.-Acrylic: Ebecry 210/265;
PE/Acrylic: Ebecry 812;
TPGDA: Tripropylene glycol diacrylate, SR 306;
HDDA: Hexane diol diacryltae;
TMPEOTA: trimethyol propane ethoxylate triacrylate, SR 454;
TMPTA: trimethylolpropane triacryltate, SR 351.
In general, all the liquid leads have better compatibility with UV resins/monomers.

Formulation A.

Step 1. Prepare the Mill Base (Set 1:1 Pigment:Solid Addition):

Pigment: 10.0
DPGDA: 30.0
Additive: 10.0
Total: 50.0

The above formulation were added to a glass bottle with glass beads add placed in the Skandex for 2 hours (Skandex No. 5 used throughout testing)

Step 2: Letdown Formulation

| 91.5 g | DPGDA |
| --- | --- |
| 0.5 g | E-3883 |
| 8.0 g | IRGACURE 379 |

The Letdown formulation is prepared in a darkened bottle and placed in the oven set at 70° C. for approximately 2 hours or until the IRGACURE 379 has fully dissolved.

Step 3: Final Ink Formulation

| 25 g | Millbase |
| --- | --- |
| 75 g | Letdown Varnish |

The above final ink formulation was added to a 40 cc white opaque container and mixed fully until a homogeneous solution is obtained.

TABLE 15

Performance of dispersant in UV inks.

| Pigment | Measurements | Competitor A | Competitor B | 74 | 75 |
| --- | --- | --- | --- | --- | --- |
| PY109 | PE Foil, Gloss 60° | N/A | 96.8 | 93.4 | 103.2 |
| | Sticker paper, Gloss 60° | N/A | 86.5 | 83.4 | 84.3 |
| | Transparency | N/A | standard | equal | equal |
| PY 110 | PE Foil, Gloss 60° | N/A | 107.0 | 105.7 | 106.8 |
| | Sticker paper, Gloss 60° | N/A | 88.9 | 86.8 | 84.9 |
| | Transparency | N/A | standard | equal | equal |
| PY 150 | PE Foil, Gloss 60° | 97.1 | 125.3 | 125.7 | 122.7 |
| | Sticker paper, Gloss 60° | 69.0 | 92.9 | 94.6 | 88.3 |
| | Transparency | N/A | standard | equal | equal |
| PY 151 | PE Foil, Gloss 60° | N/A | 96.9 | 98.3 | 96.2 |
| | Sticker paper, Gloss 60° | N/A | 91.4 | 92.0 | 89.8 |
| | Transparency | N/A | standard | equal | equal |

PY 109: Irgazin Yellow 2GLTE,
PY 110: Irgazin Yellow 3RLTN,
PY 151: Irgazin Yellow 2088;
PY 150: Cromophtal Yellow LA2. Millbase of Benchmark A is too thick to be taken out.

TABLE 16

Storage stability of dispersant in UV inks.

| Pigment | Rheology of Millbase | | Results and Commends for samples |
| --- | --- | --- | --- |
| PY 151 | Without stability | Competitor B | Standard |
| | | Ex. 74 | Lower viscosity to the standard at low shear rates however equal to the Solsperse 32000 at higher shear rates |
| | | Ex. 75 | Similar viscosity measurements to the Competitor B. |
| | Stability after 7 day at 50° C. | Competitor B | Increase in viscosity measurement after 7 days at 50° C. |
| | | Ex. 74 | Increase in viscosity measurement after 7 days at 50° C. |
| | | Ex. 75 | Similar viscosity measurements after 7 days at 50° C. |
| PY150 | Without stability | Competitor B | Standard |
| | | Ex. 74, Ex. 75 | Identifies higher viscosity measurements at both low shear rates and high shear compared against the standard Competitor B, identifies Newtonian behavior throughout the measurements. |
| | Stability after 7 day at 50° C. | Competitor B | Increase in viscosity measurement after 7 days at 50° C. |
| | | 74 | Increase in viscosity after 7 days at 50° C. |
| | | 75 | Equal viscosity measurements after 7 days at 50° C. - Stable result. |

The invention claimed is:

1. A polyethyleneimine (PEI)-based pigment dispersant of the formula I

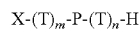

wherein

P is a polyethyleneimine (PEI) backbone;

T is a residue —CO-A-O— wherein A is $C_4$-$C_5$alkylene optionally substituted with $C_1$-$C_6$ alkyl with the proviso that each linkage between P and T is an amide bond and each linkage between X and T is an ester bond, X is a modifier or terminator residue R—CO— wherein R—CO— is a residue derived from 12-hydroxystearic acid or polyhydroxystearic acid;

n, m independently are a number from 1 to 100.

2. A process to prepare a polyethyleneimine (PEI)-based pigment dispersant of the formula I which process comprises a) ring-opening polymerisation of lactones initiated by the primary amines and the secondary amines of a PEI macroinitiator to obtain P-(T)$_n$-H b) (trans)esterification of grafting copolymers with the modifier or terminator X.

3. A process to prepare a polyethyleneimine (PEI)-based pigment dispersant of the formula 1 according to claim 1 which process comprises.

4. A process according to claim 1, wherein the weight ratio of PEI to lactone monomers ranges from 1:5 to 1:20 and wherein the chain length of polylactones approximately ranges from 500 g/mol to 5000 g/mol.

5. A process according to claim 2, wherein in step a) reaction temperatures range from 60° C. to 200° C. under N$_2$ atmosphere and in step b) reaction temperatures range from 100° C. to 200° C. under N$_2$ atmosphere.

6. A pigment dispersion comprising a compound of the formula I according to claim 1.

7. The polyethyleneimine (PEI)-based pigment dispersant of the formula I according to claim 1, wherein the dispersant is prepared by a process comprising a) ring-opening polymerisation of lactones initiated by the primary amines and the secondary amines of a PEI macroinitiator to obtain P-(T)$_n$-H b) transesterification of grafting copolymers with the modifier or terminator X.

8. The polyethyleneimine (PEI)-based pigment dispersant according to claim 7, wherein the process is a one pot process.

9. The polyethyleneimine (PEI)-based pigment dispersant according to claim 7, wherein the weight ratio of PEI to lactone monomers ranges from 1:5 to 1:20 and wherein the chain length of polylactones approximately ranges from 500 g/mol to 5000 g/mol.

10. The polyethyleneimine (PEI)-based pigment dispersant according to claim 7, wherein in step a) reaction temperatures range from 60° C. to 200° C. under N$_2$ atmosphere and in step b) reaction temperatures range from 100° C. to 200° C. under N$_2$ atmosphere.

* * * * *